Aug. 12, 1969  R. L. HATTON  3,460,246
COIL FORM METHOD OF MANUFACTURE
Filed Sept. 10, 1965  2 Sheets-Sheet 1
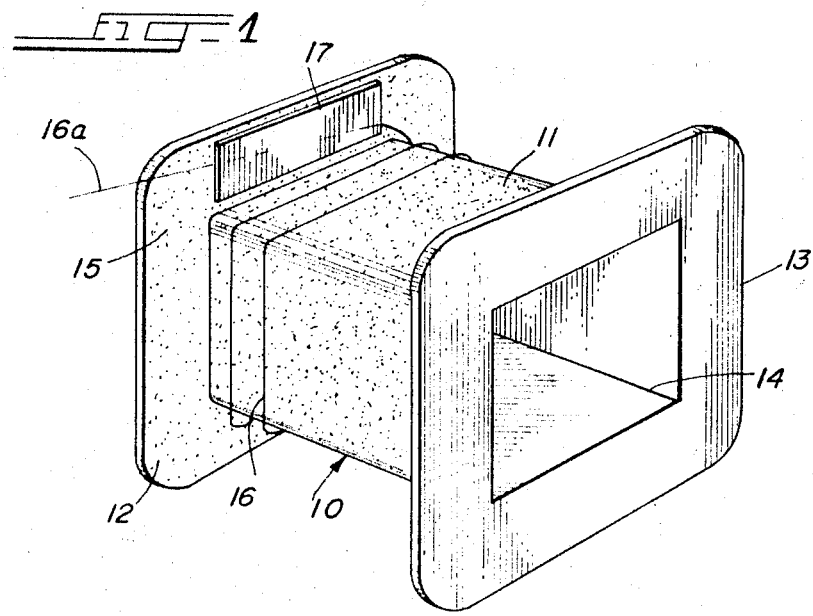
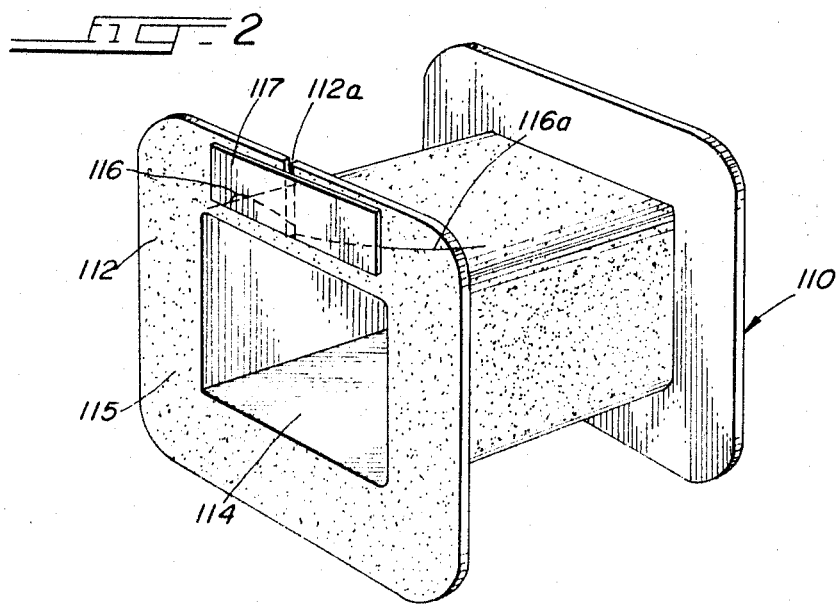
INVENTOR.
RICHARD L. HATTON
BY Aug. 12, 1969  R. L. HATTON  3,460,246
COIL FORM METHOD OF MANUFACTURE
Filed Sept. 10, 1965  2 Sheets-Sheet 2
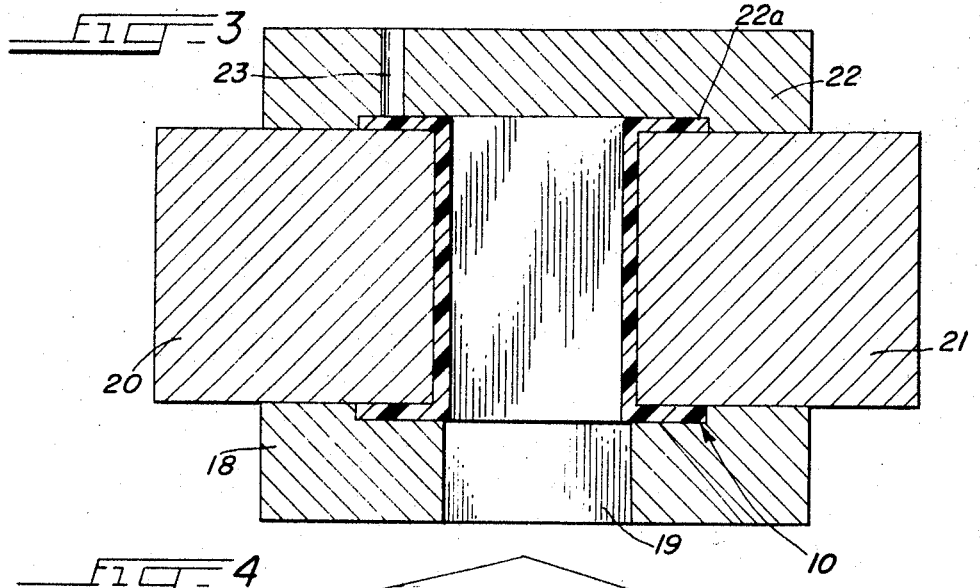
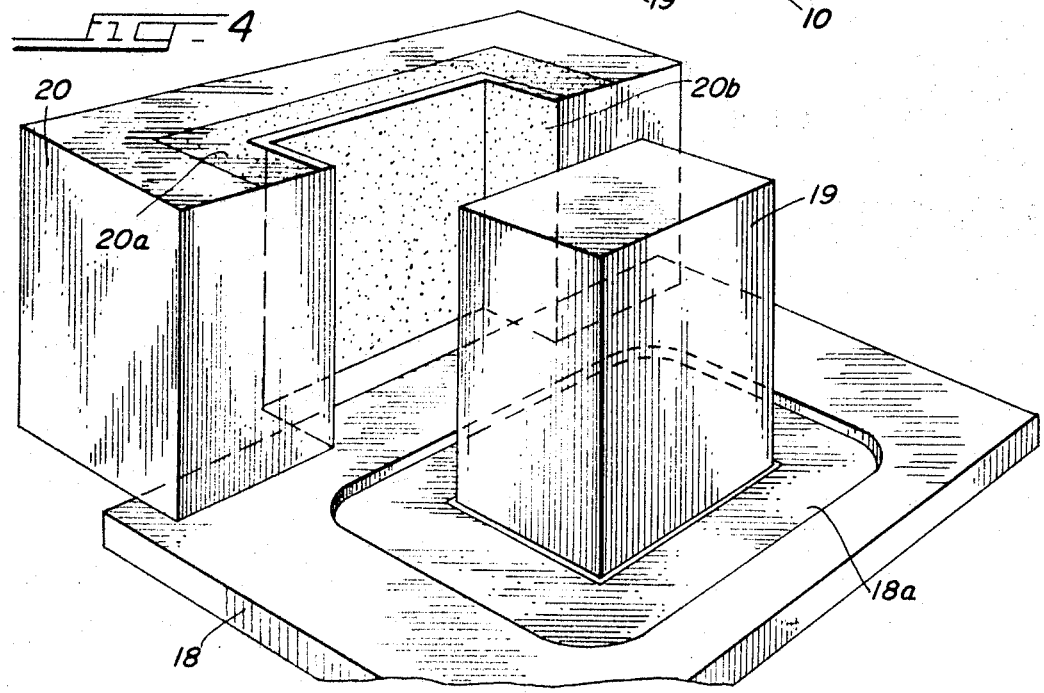
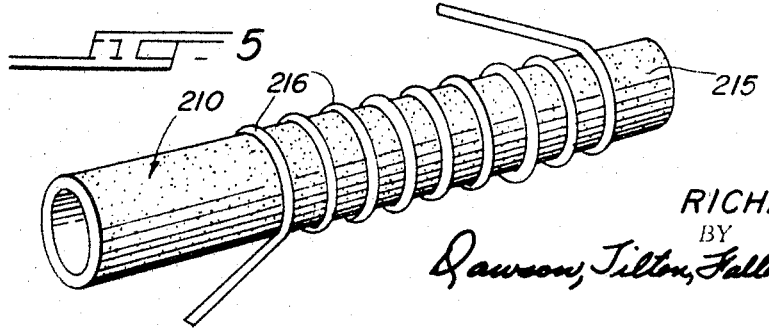
INVENTOR.
RICHARD L. HATTON
BY

United States Patent Office 3,460,246
Patented Aug. 12, 1969

3,460,246
COIL FORM METHOD OF MANUFACTURE
Richard L. Hatton, Elmhurst, Ill., assignor to Resinite
Corporation, Wheeling, Ill., a corporation of Illinois
Filed Sept. 10, 1965, Ser. No. 486,396
Int. Cl. H01f 7/06; B65h 75/12
U.S. Cl. 29—605          3 Claims

ABSTRACT OF THE DISCLOSURE

A method of manufacturing an inductor wherein a mold having a roughened surface direct developed by an electrical discharge results in a coil form having a surface roughness of the order of .00009–.0003 inch, thereafter winding a wire conductor on the form and taping the same.

---

In one aspect of the invention, a somewhat roughened surface is provided on an end flange of a bobbin-type coil form. This permits the start lead to be positively secured to the end flange by adhesive tape, a particular problem when thermoplastic materials are employed as the materials of construction for the bobbin. In the past, particular difficulty has been experienced with nylon bobbins because of the slick character of the molded material. Through the practice of the invention, I develop an advantageously roughened surface at any selected area and the provision of such a bobbin constitutes an important object of the invention.

A broader object of the invention is to provide a coil form which may be of the end flange-equipped type or otherwise and which is characterized by a novel surface adapted to support windings and the like in predetermined position or relation.

The novel surface hereinbefore referred to is advantageously developed as an incident of the molding procedure and is further made possible by the method of developing the mold itself. This I find advantageously done through the use of an electric discharge machine wherein high-frequency electrical discharge is employed to cut into oil hardened tool steel for redevelopment of the necessary molding cavity. The discharge procedure results in a somewhat roughened surface, i.e., of the order of a variation of 0.0003" maximum between peaks and valleys of the surface which provide an advantageous anchor for adhesive tape windings, etc., the provision of a procedure employing the electrical discharge method for developing a mold cavity thus constitutes another object of the invention.

Other objects and advantages of the invention may be seen in the details of construction and operation set down in this specification.

The invention is explained in conjunction with the accompanying drawing, in which:

FIG. 1 is a perspective view of a coil form constructed according to the teachings of this invention;

FIG. 2 is a perspective view of a modified form of coil form also following the teachings of this invention;

FIG. 3 is a fragmentary sectional view through the mold employed to develop the coil form of FIG. 1;

FIG. 4 is a fragmentary perspective exploded view of the bottom and one side portion of the mold of FIG. 3; and FIG. 5 is a perspective view of yet another type of coil form.

In the illustration given and with reference to FIG. 1, the numeral 10 designates generally a coil form of the "bobbin" type. The bobbin 10 includes a spool part 11 and end flange parts 12 and 13. The interior or core of the spool part 11 is hollow as at 14 and the stippling designated 15 indicates a roughened interior surface on the flange 12.

The bobbin 10 is intended to be wound with wire as at 16 with the numeral 16a designating the start lead of the winding. A tape suitably equipped with adhesive and designated 17 is employed to immobilize the start lead 16a against the interior surface 15 of the flange 12.

In the development of the inductor utilizing the bobbin 10 as the coil form, the conductor wire 16 is first immobilized in place by means of the adhesive tape 17. Advantageously, this is achieved through applying the tape 17 against the interior wall of the flange 12. Thereafter, the wire 16 is wound in a plurality of turns—in some instances upwards of 30,000 or 40,000 turns for the development of a transformer. Incident to this winding operation wherein the turns of wire are not precisely predetermined insofar as location is concerned, i.e., somewhat random winding, there is the possibility that the lacquer insulation about the start lead 16a may be abraded by the successive turns of wire 16. This, of course, could result in a short and complete loss of the inductor. Further, there is a distinct difference in potential between the start lead 16a and the last turns of wire so that the additional insulation provided by the tape 17 is highly advantageous.

Thus far, the description has been directed to coil forms of the bobbin-type, i.e., equipped with integral end flanges. It will be appreciated that coil forms also may assume the shape of the cylinder see in FIG. 5 where no end flanges are provided. The end flanges normally are employed where a large number of turns are present, so as to confine and immobilize the great number of turns—particularly against displacement in a direction axially of the form.

For the development of the roughened surface 15, I employ a die or mold having a cavity provided therein through electrical discharge cutting. Thus, when the thermoplastic material constituting the bobbin pin is introduced into the mold, the roughened character of the mold is imparted to the solidified thermoplastic material. Excellent results are obtained using thermoplastic material such as propolypropylene or nylon.

The mold which can be used for the development of a bobbin such as that indicated at 10 in FIG. 1 is seen in FIGS. 3 and 4. In FIGS. 3 and 4, the numeral 18 designates the mold bottom plate or portion and which is usually stationary in the injection molding machine. The plate 18 is equipped with an upright center post 19 which is employed for developing the hollow core 14 (see FIG. 1). The numerals 20 and 21 are side acting cores with the upper surface of the core 20 being roughened as at 20a in FIG. 4 for developing the roughened surface 15 on the flange 12. The numeral 22 designates the top plate which is equipped with a shiftable knockout pin 23 (see the upper lefthand corner of FIG. 3). In the operation of the mold just described, the cavity defined by the parts 18–22 is initially filled with solidifiable resinous material. Upon solidification, the elements are moved upwardly as a unit whereby the bobbin 10 is supported by the side acting cores 20 and 21 and retained within the face cavity 22a corresponding to the face cavity 18a seen in FIG. 4.

The side acting cores 20 and 21 are moved away from each other, i.e., horizontally as shown, so as to leave the bobbin 10 supported only on the top plate 22. Thereafter, the knockout pin 23 is moved so as to eject the bobbin.

From this operation, it will be seen that the roughened interior flange surface 15 can be advantageously developed by providing a roughened top surface 20a on the side acting core 20. The same means for developing the cavity 20b (see FIG. 4) is employed for developing the roughened surface 20a. The electrical discharge procedure can be advantageously developed from an electrical discharge machine such as that manufactured by the Ingersoll Milling Machine Co., of Rockford, Ill. Such a machine employs a carbon electrode contoured to the shape of a cavity or a roughened surface and operates normally at a 0.0001" spacing from the surface being cut or otherwise fused while the surface is maintained in a bath of cutting oil. For developing cavities such as that designated 20b in FIG. 4, I cause a current of about 20 amperes to flow for 5 to 15 minutes, the voltage being applied having a frequency of the order of 135,000 c.p.s. The final removal of the mold material—advantageously the mold material is of oil hardened tool steel, is achieved through the imposition of a 7 amp. current and this results in a slightly roughened surface—a variation between the peaks and valleys of the surface of up to about 0.0003" but more generally a variation within the range of 0.000009" and 0.00015".

A variation of the coil form developable to the practice of the invention is seen in FIG. 2 and here, all surfaces of the bobbin 110 may be roughened—as by having the mold parts responsible therefor finished using the above-mentioned electrical discharge procedure. In the illustration given in FIG. 2, the flange 112 is seen to have a slot 112a and the start lead 116a is seen to extend through the slot 112a. The lead 116a is maintained in place by virtue of the imposition of tape 117 against the roughened surface 115. In addition to taping the lead 116a in place, the tape 117 also serves to increase the Dielectric constant of the space between the windings developed by the wire 116 and the usual lamination (not shown) provided in the hollow interior 114 of the bobbin 110.

Still another form of inductor support is seen in FIG. 5 wherein the cylindrical form is designated by the numeral 210 and is seen to have a roughened outer surface 215. This facilitates the immobilization of the windings 216 without the need for expensive adhesives. Further, in the case of certain material such as nylon, even the expensive adhesives are generally inadequate to immobilize the various windings 216. By virtue of utilizing a mold developed through the electrical discharge procedure, I am able to provide a surface which immobilizes the winding not only economically, but generally in a fashion superior to the prior construction utilizing adhesives.

While in the foregoing specification, a detailed description of the invention has been set down for the purpose of illustration, many variations in the details herein given may be made by those skilled in the art without departing from the spirit and scope of the invention.

I claim:
1. The method of inductor manufacture comprising the steps of electrical discharge forming a metal mold for providing a roughened surface molding surface thereon, injecting fluid solidifiable resinous material into said mold to produce a coil form having a surface corresponding to said molding surface, solidifying said material into a coil form, said coil form surface having a roughness of the order of about .00009–.0003 inch, removing the form from said mold, securing a wire conductor against the roughed surface by overlapping and adhering a tape to said roughened surface and said conductor, and winding said wire conductor about said form.

2. The method of claim 1 further including equipping said form with flanges to provide a bobbin, said coil form surface being provided on one of said flanges.

3. The method of claim 2 further including the step of equipping said one flange with a slot aligned with said tape, said tape overlying said slot to increase the dielectric constant between the wire within said flanges and an external metallic support.

References Cited

UNITED STATES PATENTS

| | | | |
|---|---|---|---|
| 1,522,036 | 1/1925 | Snyder | 24—118.32 |
| 1,589,177 | 6/1926 | Kendall | 264—274 XR |
| 2,163,618 | 6/1939 | Muller | 242—118.3 |
| 2,449,917 | 9/1948 | Tansley | 219—70 |
| 2,793,822 | 5/1957 | Consoletti | 242—118.32 |
| 3,034,743 | 5/1962 | Hill | 242—118.32 |
| 3,080,642 | 3/1963 | Woods et al. | 179—100.2 XR |
| 3,165,564 | 1/1965 | Howle et al. | 242—118.32 XR |
| 3,263,942 | 8/1966 | Elwell | 242—118.32 |
| 3,271,848 | 9/1966 | Montandon | 219—69 XR |
| 3,200,273 | 8/1965 | Lindt et al. | 317—13 XR |

JOHN F. CAMPBELL, Primary Examiner

ROBERT W. CHURCH, Assistant Examiner

U.S. Cl. X.R.

18—34; 29—602; 219—68, 69; 242—118; 249—16; 264—22, 39; 336—198, 205, 208